United States Patent

[11] 3,607,694

| [72] | Inventors | Allyn Harold Heit<br>Mount Holly;<br>James Norris Williamson, Marlton, both of N.J. |
|------|-----------|------------------------------------------------------------------|
| [21] | Appl. No. | 719,361 |
| [22] | Filed     | Apr. 8, 1968 |
| [45] | Patented  | Sept. 21, 1971 |
| [73] | Assignee  | Sybron Corporation<br>Rochester, N.Y. |

[54] PER(HALO-OXYGEN) ACID OXIDATION, PURIFICATION AND RECOVERY PROCESS
4 Claims, 2 Drawing Figs.

[52] U.S. Cl. .................................................. 204/180 P
[51] Int. Cl. .................................................. B01d 13/02
[50] Field of Search .................................... 204/180 P, 301

[56] References Cited
UNITED STATES PATENTS
3,239,442  3/1966  Tirrell .......................... 204/180
FOREIGN PATENTS
41-1695  7/1966  Japan .......................... 204/180 P Primary Examiner—John H. Mack
Assistant Examiner—A. C. Prescott
Attorney—Theodore B. Roessel ABSTRACT: An electrodialytic apparatus utilizing anion and cation permselective membranes and having at least one two-chamber cell for purification and at least one three-chamber cell proximal the two-chamber unit for concentration of aqueous per(halo-oxygen) acids and their salts, all anolyte chambers sharing a common anolyte stream, all catholyte chambers sharing a common catholyte stream, and at least one of the anolyte chambers of the purification and the concentration cells sharing a common anode. A multistep process for recovering and regenerating the periodate oxidant used in preparing oxidized polysaccharides in which the primary liquor and subsequent wash liquors from the oxidized polysaccharide filter cake are circulated in the anolyte and middle chambers of the electrodialytic apparatus having two-chamber and three-chamber cells for reoxidation and concentration respectively, the liquors having a concentration of 1 to 15 weight percent being circulated in the anolyte chambers; those liquors having a concentration of 0.5 to 5 weight percent being circulated in the middle chamber, all liquors and effluents having a concentration of less than 0.5 weight percent being passed through a strong base anion exchange resin which removes the remaining periodate or chemically reduced periodates, which are subsequently eluted by the sodium hydroxide catholyte, which in turn is circulated in the anolyte chambers of the apparatus for regeneration.

FIG. 1

INVENTORS.
ALLYN H. HEIT
JAMES N. WILLIAMSON
BY
Theodore B Roessel
ATTORNEY

FIG. 2

INVENTORS.
ALLYN H. HEIT
JAMES N. WILLIAMSON
BY
ATTORNEY

PER(HALO-OXYGEN) ACID OXIDATION, PURIFICATION AND RECOVERY PROCESS

This invention relates generally to a process for the electrolytic recovery and regeneration of inorganic halogen acids and their salts and an apparatus therefor. More particularly it relates to a method for the electrodialytic recovery, and regeneration of periodic acid and its salts, and reuse of the periodic acid and its salts in the oxidation of polysaccharides.

The Malaprade reaction is an illustration of the application of periodic acid and its salts in organic oxidations. This reaction consists in the treatment of an organic material having vicinal hydroxy groups with either periodic acid or an alkali metal periodate resulting (a) in the conversion of the vicinal hydroxy groups to aldehyde and (b) in the conversion of the periodic acid or the periodate salt to a chemically reduced form such as, iodic acid or its salts. The reaction may be shown as:

where (1) represents the vicinal hydroxy groups such as those found in starch or cellulose, (2) represents the aldehyde group and (3) represents the chemically reduced periodic acid or periodate. A typical Malaprade reaction may be illustrated by the conversion of starch regardless of vegetable origin, to so-called dialdehyde starch as represented by (2) in the above reaction. The starches and celluloses so treated are members of the class designated as polysaccharides, and the products, polysaccharides oxidized by periodic acid and its salts, may be referred to as oxidized polysaccharides.

The production of dialdehyde starch and other oxidized polysaccharides has attained commercial status, and due to the expense involved in the use of the expensive periodic acid and its salts as oxidants, and the need for a more efficient and economical process for the production of the oxidized polysaccharides has arisen. Public concern and legislation also require the development of methods resulting in the absence of contamination and pollution of rivers, lakes, underground water tables and the like, from the discharge of process effluents. Several methods, both electrolytic and chemical and combinations thereof, have been developed for the production of dialdehyde starch and other oxidized polysaccharides; however, none of these electrolytic methods are economically capable of any more than oxidation of chemically reduced periodic acid or its salts present in liquors in excess of 4 weight percent of the periodic acid or its salts. It is therefore the primary object of this invention to provide an electrolytic apparatus in which chemically reduced oxidants in the form of inorganic ion dissociable materials may be electrolytically oxidized simultaneously with the electrolytic concentration of the oxidants and chemically reduced oxidants.

It has been shown in U.S. Pat. No. 2,648,629 and U.S. Pat No. 2,713,553 that polysaccharide materials can be oxidized in a two-chamber electrolytic cell in which periodic acid is formed and simultaneously consumed by the starch. It has also been demonstrated in U.S. Pat. No. 2,830,941 that alkali metal periodate can be prepared electrolytically by a separate unit operation thereby eliminating the various complications attending the maintenance of a starch-iodate slurry within the electrolytic cell. U.S. Pat. No. 2,648,629, U.S. Pat. No. 2,713,553 and U.S. Pat. No. 3,131,137 set forth design parameters of two-chamber periodate cells. The electrolytic cells which are used in connection with the oxidation of polysaccharides and are disclosed in the prior art in general share the following features: (1) open-cell structure, (2) use of alundum thimbles as barriers between catholyte and anolyte chambers, (3) planar rectangular or cylindrical lead anodes, (4) rod or tube steel cathodes and (5) circulation of anolyte by agitator action or pumping from a reservoir.

An electrolytic cell having multiples of a two-chamber unit has been enclosed in Industrial and Engineering Chemistry, Process Design and Development, Vol. 1, page 144 (1962). Each two-chamber unit has an anolyte chamber and a catholyte chamber separated by a diaphragm. Using iodic acid as anolyte and sodium hydroxide as catholyte, periodic acid can be formed at the anode when a potential difference is applied across the electrodes. In a typical example using this prior art multiple unit electrolytic cell a starch slurry (not within the cell) is first oxidized to dialdehyde starch by means of a periodic acid solution. A filter cake of the oxidized starch is separated from the slurry, and the acidic iodate-rich liquor obtained after separation is cycled through an evaporator where much of the water is removed. The acidic iodate-rich liquor concentrated by evaporation is circulated in the anolyte chamber of the electrolytic cell where the periodic acid is regenerated at the anode. A 5% sodium hydroxide catholyte solution is used in the catholyte chamber of the cell. Small quantities of the catholyte solution are added to the anolyte solution to maintain the pH as required.

These prior art electrolytic cells and processes suffer from several major deficiencies, which in the main, have prevented their commercial acceptance. Among them is the fact that no provision is made for handling the dilute wash waters and other effluents which contain about 0.01 to 4.0 weight percent of periodic acid, and its salts and chemically reduced periodic acid and its salts except for a separate concentrating by flash evaporation. As a practical matter recovery is generally postulated on only 8 to 10 weight percent iodate liquors in the prior art processes.

Evaporation is unavoidably limited to the stronger concentrations of the dilute wash waters by reason of the economics of evaporation techniques. The presence of heat in such evaporation techniques leads to the decomposition of the acidic solutions of iodine-containing acids and their salts through interaction with various organic materials, such as, oils, fats, protein residues and water soluble extracts, leached into the slurries and liquors from the polysaccharides under treatment or formed from the polysaccharides by a hydrolytic or oxidative degradation of the starch. Therefore, it is an object of this invention to provide a process for the oxidation of polysaccharides in which all periodic acid and its salts and chemically reduced periodic acid and its salts present in wash waters and liquors are recovered and regenerated without resorting to destructive evaporation techniques.

The prior art electrolytic cells and processes suffer from other disadvantages which include a limitation upon current densities due to inadequate electrolyte circulation rates of aqueous solutions of periodic acid and its salts; no provision for the circulation of catholyte except by periodic semimanual emptying of reservoirs when the concentration of caustic becomes excessive; and partial utilization of the lead anode surfaces. Therefore, it is an object of this invention to provide an electrolytic apparatus for the purification and concentration of inorganic ion dissociable materials in which anolyte and catholyte are continuously circulated in a closed system and the surfaces of the lead anodes are completely utilized.

Another object of this invention is to provide a process for the removal of substantially all periodic acid and its salts and chemically reduced periodic acid and its salts from oxidized polysaccharide wash waters, liquors and effluents which are recycled for use as wash water or discarded. Other objects will become evident to those skilled in the art from a reading of this specification and the appended claims and drawings.

We have found that the objects of this invention can be carried out by the construction and operation of single electrodialytic apparatus consisting of two sections, one section having a two-chamber unit designated as a purification cell or multiples thereof and the other section having a three-chamber unit designated as a concentration cell or multiples thereof. The purification and concentration sections are physically integrated into a unit construction in such a manner that the purification section or multiples thereof are proximal the concentration section or multiples thereof within a single frame. Both the purification and concentration sections derive current from a common direct current power source, derive catholyte from a common closed catholyte circulating system and derive anolyte from a common closed anolyte circulating system. The purification section of the electrolytic apparatus consists of at least one two-chamber arrangement characterized by an anolyte chamber, an anode having a surface in the anolyte chamber in contact with the anolyte, a catholyte chamber, having a cathode having a surface in the anolyte chamber in contact with the catholyte, and a cation permselective membrane separating the chambers, one surface of which serves as a barrier for the anolyte chamber and the other surface of which serves as a barrier for the catholyte chamber, all elements being mounted within a suitable frame.

The concentration section mounted proximal to the purification section within the same suitable frame, consists of at least one three-chamber arrangement characterized by an anolyte chamber, an anode having a surface in the anolyte chamber in contact with the anolyte, a middle chamber, an anion permselective membrane separating the anolyte chamber from the middle chamber, a catholyte chamber, a cathode having a surface in the catholyte chamber in contact with the catholyte and a permselective membrane separating the catholyte chamber from the middle chamber. All membranes serve as barriers for the chambers which they separate. The permselective membrane utilized to separate the catholyte chamber from the middle chamber may be either an anion permselective membrane or a cation permselective membrane. All anolyte chambers in the purification section of the apparatus are connected by pipe or suitable conduit to all anolyte chambers in the concentration section and share a common anolyte reservoir. All catholyte chambers in the purification section of the apparatus are connected by pipe or suitable conduit to all catholyte chambers in the concentration section and share a common catholyte reservoir.

The preferred multiple-cell purification section is constructed in such a manner that there is maximum utilization of the anode surface. Thus, one anode may serve as the anode for two anolyte chambers. In the preferred multiple-cell purification section one catholyte chamber and its circulating stream of catholyte liquor serves two anolyte chambers and streams, one of the anolyte chambers being located on one side of the catholyte chamber and the other located on the opposite side of the catholyte chamber with necessary permselective membranes and other required elements inserted therebetween.

The preferred multiple-cell concentration section is constructed in such a manner that there is maximum utilization of the anode surface. Thus, one anode serves as the anode for two anolyte chambers. In the preferred multiple-cell embodiment one catholyte chamber and its circulating stream in the concentration section serves two middle chambers and streams. In the preferred embodiment of the apparatus having a concentration section and a purification system, at least one of the anolyte chambers of a concentration section and the purification section share a common anode. However, cell construction may be varied to permit a chamber arrangement in which at least one catholyte chamber of the purification section and at least one catholyte chamber of the concentration section share a common anode. Although the preferred cell arrangement is designated above, we do not intend to limit the unit construction and the general plan of anolyte and catholyte systems common to both purification and concentration systems to any specific arrangement of electrolyte chambers, electrodes and the like.

The function of the purification section of the electrolytic apparatus is the regeneration of chemically reduced inorganic per(halo-oxygen) acids and their salts at the anode and the removal of cations from the anolyte liquor. Such chemically reduced inorganic per(halo-oxygen) acids and their salts which may be regenerated in the anolyte chambers include chemically reduced periodic acid, sodium periodate, perchloric acid, sodium perchlorate, ammonium perchlorate or mixtures of such iodates, chlorates, periodates and perchlorates combined with such cations as $Na^+$, $H^+$, $HH_4^+$. The oxygen required for the necessary regeneration is generated by the electrolytic decomposition of water at the anode. Thus, iodide anion will be oxidized to iodate anion which will be further oxidized to periodate anion at the anode. This oxidation process at the anode is accompanied by a simultaneous migration of cations across the cation permselective membrane separating the anolyte and catholyte chambers from the anolyte liquor to the caustic catholyte liquor. In this way undesirable cations, such as, sodium, ammonium and the like may be removed from the anolyte liquor, hence the designation of this section or cell as the purification section. The preferred caustic catholyte liquor is a 5 percent aqueous solution of sodium hydroxide. Hydroxide anion is generated by the electrolytic decomposition of water at the cathode, however, the cation permselective membrane prevents the migration of the cations to the anode resulting in a net increase in caustic concentration of the catholyte liquor due to the presence of the migrant cations and the retained hydroxide anions.

The primary function of the three-chamber or concentration section of the electrolytic apparatus is the concentration of inorganic per(halo-oxygen) anions and their chemically reduced derivatives including iodate, chlorate, iodide and chloride. These per(halo-oxygen) anions may be paired with a cation or a combination of such cations as sodium cation, ammonium anion and hydrogen. The periodate, iodate and like anions initially in the middle chamber and designated as dialysate, migrate from the middle chamber toward the anode through the anion permselective membrane into the anolyte. Concurrently with the concentrating function the anolyte chamber also functions in the oxidative regeneration of the chemically reduced per(halo-oxygen) anions and their salts in the same way that the anolyte chamber of the purification section regenerates the chemically reduced acids and their salts. Since an anion permselective membrane is used between the anolyte and middle chambers, anions are permitted to pass from the middle chamber to the anolyte chamber while cations are prohibited from migrating from the anolyte chamber to the middle chamber. The iodate-periodate or other per(halo-oxygen) anions or their chemically reduced derivatives which migrate from the middle stream are replaced predominantly by hydroxyl anions migrating toward the anode from the catholyte chamber when the permselective membrane between the catholyte and middle chambers is an anion permselective membrane. By this mechanism the anolyte liquor becomes enriched with the iodate, periodate or any other halogen anion derivative which may be present, while the middle chamber electrolyte (dialysate), subsequently destined for waste or further treatment by an anion exchange resin bed, is depleted in iodate, periodate and other halogen anion derivatives.

A cation permselective membrane may also be used between the catholyte and middle chambers. When this arrangement is used the cations present in the dialysate circulating in the middle chamber migrate toward the cathode through the cation permselective membrane into the catholyte liquor where they unite with the hydroxyl ion retained in the catholyte liquor by reason of the cation permselective barrier. The dialysate circulated in the middle chamber may be an aqueous solution of per(halo-oxygen) acids and their salts and chemically reduced derivatives thereof.

Suitable anion and cation exchange membranes which must remain stable for long periods of exposure to the corrosive action of the liquid media used as circulating liquors, were used in the electrodialytic apparatus. The Ionac Chemical Company 3400 series permselective membranes have proven sufficiently durable to withstand such corrosivity and may be used in the apparatus of this invention.

The electrodialytic cell of this invention is constructed in such a way that the entire system including all chambers, electrodes and circulating systems can operate simultaneously at full efficiency. Any individual section or unit of the electrodialytic apparatus may be disengaged from operation while other sections or units of the cell continue to operate efficiently. This can be accomplished by merely obstructing the circulating stream to any individual chamber or section.

The anodes used in the electrodialytic cell of this invention are preferably of a silver-lead alloy containing approximately 1 percent silver. Both sides of each lead anode plate are used to supply current to an anolyte chamber in the preferred embodiment of this invention. Thus, a typical purification section in a multiple-cell arrangement may have the following series of elements: an anloyte chamber at the end of the unit, than a catholyte chamber, an anolyte chamber, an anolyte chamber, a catholyte chamber and the like. A typical concentration section in a multiple-cell arrangement may have the following series of elements: a catholyte chamber, middle chamber, anolyte chamber, anolyte chamber, middle chamber, catholyte chamber and the like. Terminal anolyte chambers are served by a single anode and terminal catholyte chambers serve a single anolyte chamber in the preferred embodiment.

During the operation of the electrolytic apparatus the effective difference in potential is considered to be that amount of current which will cause (a) the migration of a sufficient number of anions and cations to substantially vary the concentrations of the liquors within the chambers in a designated interval of time and (b) the oxidation or regeneration of a substantial number of the chemically reduced inorganic anions within a designated interval of time.

In relation to the electrolytic apparatus of this invention we have also found a process for quantitatively recovering and regenerating the periodate oxidant used in preparing oxidized polysaccharides. The first step in this process is the separation, water washing and drying of oxidized polysaccharides in successive steps to form a solid product and as many aqueous liquors as necessary to substantially remove all periodate and chemically reduced periodate anions from the solid filter cake by successive water washings.

In the preferred embodiment of the process for oxidizing polysaccharides the primary liquor obtained from the filtration of the mother liquor from the oxidized polysaccharide has a periodate and chemically reduced periodate anion concentration of about 4 to 15 weight percent. Washing of the filter cake with either de-ionized water or water from which all periodate and chemically reduced periodate anions have been removed and hereafter designated as de-anionized water, produces a secondary liquor having from about 1 to 8 weight percent of periodate and chemically reduced periodate anions. Subsequent washings of the filter cake as above produce a tertiary liquor having from about 0.5 to 5 weight percent of periodate and chemically reduced periodate anions and a quaternary liquor having from about 0.01 to 0.5 weight percent of periodate and chemically reduced periodate anions. Each of these liquors may be subsequently concentrated to about 5 to 15 weight percent of periodate and chemically reduced periodate anions, and the chemically reduced periodate anions may be oxidized to periodate anions for reuse in oxidizing polysaccharides.

All of the aqueous periodate and chemically reduced periodate anions present in the liquors obtained from the filtering and washing of the filter cake in which the concentration of the periodate and chemically reduced periodate anion concentration is in excess of about 0.5 weight percent, may be concentrated to about 5 to 15 weight percent by circulating the liquid in the middle chamber of the concentration cell set out above. All aqueous periodate and chemically reduced periodate anions present in the liquors obtained from the washing and filtering of the filter cake in which the concentration of the periodate and chemically reduced periodate anion concentration is less than about 0.5 weight percent, may be concentrated by ion accumulation on an anion exchange resin. The anions accumulated on the anion exchange resin may be eluted from the resin by using an aqueous caustic solution and in the preferred embodiment may be eluted by the caustic catholyte liquor from the electrolytic apparatus discussed above. The eluate may then be circulated in the anolyte chamber of the electrolytic apparatus where the chemically reduced periodate anions, such as, sodium iodate, will be oxidized to the periodate anion. All references to periodate anions refer to periodic acid as well as to its sodium and other salts.

All chemically reduced periodate anions are circulated in the anolyte chamber of the electrodialytic apparatus to convert the chemically reduced periodate anion to the periodate anion.

When the aqueous liquors having from about 0.5 to 5 weight percent of periodate and chemically reduced periodate anions are circulated in the middle chamber of the electrolytic apparatus, the periodate and chemically reduced periodate anions migrate across the anion permselective membrane to the anolyte chamber to provide an aqueous solution in the anolyte chamber of about 5 to 15 weight percent periodate and chemically reduced periodate anions. The chemically reduced periodate anions which have migrated to the anolyte chamber of the concentration section, are then oxidized to periodate anions in the anolyte chambers of both the concentration and purification sections. The middle chamber effluent which may be designated as a quinary liquor, contains about 0.01 to 0.5 weight percent periodate and chemically reduced periodate and is passed through the anion exchange resin to remove substantially all traces of the periodate and chemically reduced periodate anions. The same ion exchange resin bed may be used to remove periodate and chemically reduced periodate from the quaternary and quinary liquors. The effluent from the anion exchange resin bed is completely deanionized. By de-anionized we mean that all periodate and chemically reduced periodate anions are removed from the effluent.

A suitable ion exchange resin for the removal of the periodate and chemically reduced periodate anions is a strong base polystyrene alkyl quaternary ammonium ion exchanged resin in the sulfate form manufactured by Ionac Chemical Company as Ionac A-540. This ion exchange resin insures complete removal of all traces of iodine, iodic acid, periodic acid and their salts from the effluent water which may be utilized in subsequent washing of oxidized polysaccharide filter cakes or may be discarded as waste.

A complete understanding of the invention may be obtained from the following description and explanation which refer to the accompanying drawings illustrating an embodiment directed to the recovery and regeneration of periodic acid and its salts and chemically reduced derivatives thereof.

Figure 1:
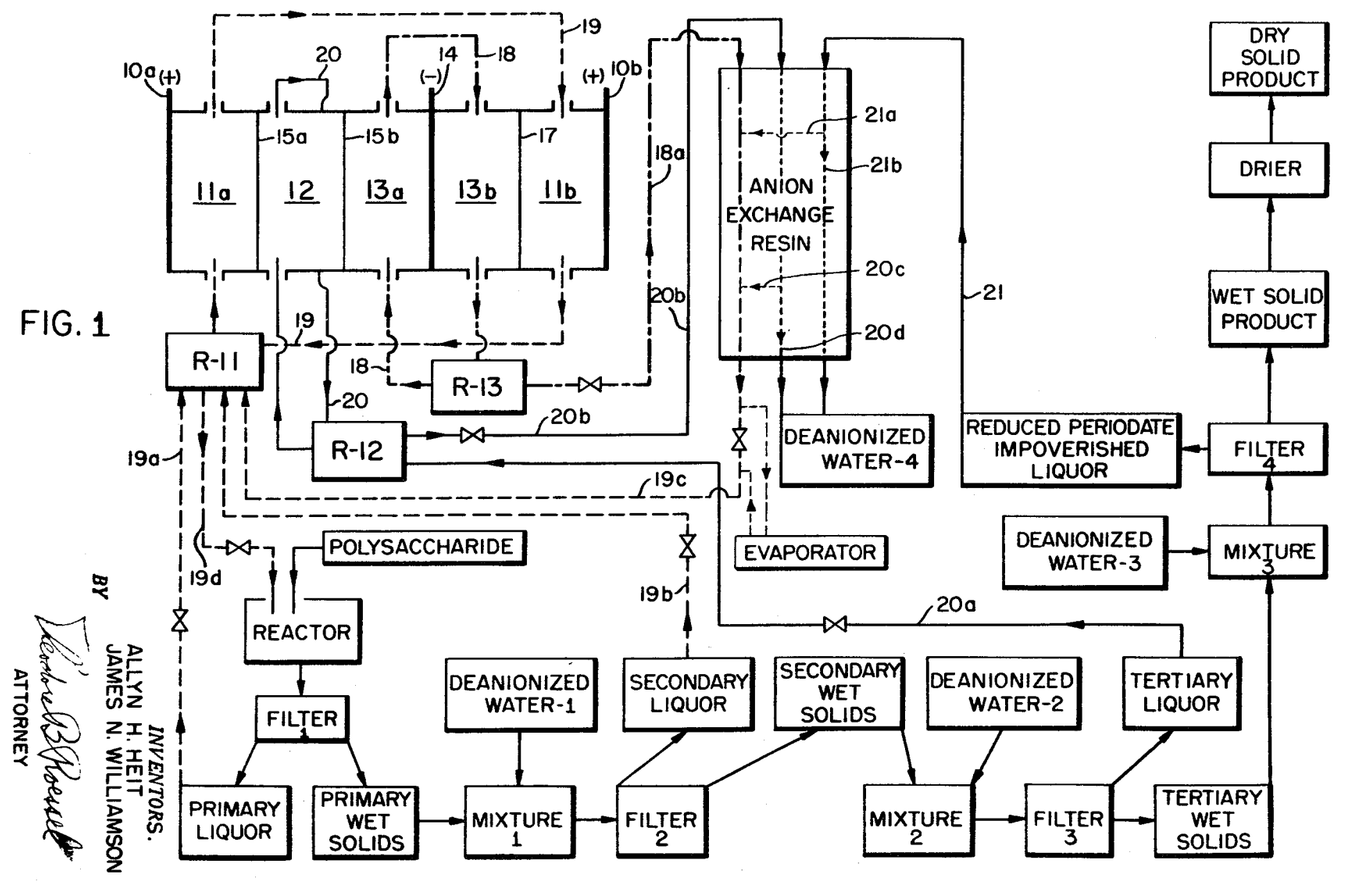
FIG. 1 is a diagrammatic representation of a process for oxidizing polysaccharides and recovering and regenerating the periodate oxidant used in oxidizing the polysaccharide.

Referring to FIG. 1, a polysaccharide and anolyte from the stream designated as 19d containing regenerated periodic acid and its salts in a concentration of about 5–15 weight percent taken from anolyte reservoir R–11, are reacted in an ordinary reactor. The resulting oxidized polysaccharide slurry is filtered at filter step 1 resulting in the separation of the primary liquor from the primary wet solids. The primary liquor, which contains less than 5–15 weight percent of unreacted periodic acid and its salts and chemically reduced periodic acid and its salts, is returned to reservoir R–11 by conduit 19a for subsequent reoxidation in the anolyte chambers 11a and 11b of the electrolytic apparatus.

The primary wet solids are then washed or slurried with de-anionized water-1, which may be completely de-ionized water or water in which periodate and chemically reduced periodate anions have been removed, to form mixture 1. Mixture 1 is filtered at filter step 2 resulting in the separation of secondary wet solids and secondary liquor. The secondary liquor containing about 1 to 8 weight percent periodate and chemically reduced periodate is added to anolyte reservoir R–11 by means of conduit 19b. Thus, the primary and secondary liquors are returned to anolyte reservoir R-11 for subsequent reoxidation in anolyte chambers 11a and 11b of the electrolytic apparatus.

The secondary wet solids are washed or slurried with de-anionized water-2 to form mixture 2. Mixture 2 is filtered by standard filtration techniques in filter step 3 to provide a tertiary liquor and tertiary wet solids. The tertiary liquor having a periodate and chemically reduced periodate concentration of about 0.5 to 5 weight percent passes to middle chamber reservoir R-12 by means of conduit 20a to become the liquor designated as dialysate or electrodialysate. The dialysate is circulated by means of conduit 20 to, through and form the middle chamber 12 of the electrolytic apparatus. When the concentration of the dialysate in reservoir R-12 reaches about 0.01 to 0.5 weight percent of periodate and chemically reduced periodate anions, the dialysate is passed to an anion exchange resin bed or column by means of conduit 20b. As the dialysate liquor passes through the anion exchange resin the periodate and chemically reduced periodate anions accumulate on the anion exchange resin, and the effluent stream, 20d, passing from the anion exchange resin bed, is designated de-anionized water-4. De-anionized water-4 has no trace of periodate or chemically reduced periodate anions until the anion exchange resin has been exhausted and requires regeneration. However, de-anionized water-4 may contain hydroxyl anion. De-anionized water-4 may be used as wash waters designated as de-anionized water-1, -2 and -3, or it may be discarded as waste from which all periodate and chemically reduced periodate anions have been removed. De-anionized water-1, -2 and -3 may be any type of water purified by distillation or ion exchange processes.

The tertiary wet solids are washed or slurried with de-anionized water-3 to form mixture 3. Mixture 3 is filtered at filter step 4 producing a reduced periodate impoverished liquor and a wet solid product. The wet solid product is an oxidized polysaccharide which is subsequently dried to form a dry solid product useful as fabric softeners and the like. The reduced periodate impoverished liquor, the quaternary liquor, has a periodate and chemically reduced periodate anion concentration of about 0.01 to 0.5 weight percent and is passed by conduit 21 to the anion exchange resin bed where the periodate anions are accumulated on the anion exchange resin, and the effluent designated as 21b is added to the de-anionized water-4 in a manner similar to that explained for the dialysate effluent which passes through conduit 20b.

The periodate and chemically reduced periodate anion which have accumulated on the anion exchange resin may be eluted from the resin by caustic catholyte from catholyte reservoir R-13. The caustic catholyte, which has a concentration of about 5 to 10 weight percent sodium hydroxide, passes by conduit 18a to the anion exchange resin. The periodate and chemically reduced periodate anions are eluted from the anion exchange resin and pass by conduit 19c to anolyte reservoir R-11 for reoxidation of the chemically reduced periodate, and the anion exchange resin in regenerated for subsequent removal of periodate anions. An evaporator may be placed in conduit 19c to concentrate the elute prior to addition to reservoir R-11.

Catholyte reservoir supplies catholyte to catholyte chambers 13a and 13b by means of conduit 18. The electrolytic apparatus designated in FIG. 1 is a five chamber unit in which chambers 11a, 12 and 13a deriving electrical potential from anode 10a and cathode 14, form the concentration section of the cell. The purification section of the cell which derives electrical potential from anode 10b and cathode 14, is made up of chambers 13b and 11b. Anolyte chamber 11b and catholyte chamber 13b are separated by cation permselective membrane 17. Anolyte chamber 11a and middle chamber 12 are separated by anion permselective membrane 15b. The anion permselective membrane 15b may be replaced by a cation permselective membrane with no adverse effect upon the overall recovery and regeneration scheme. Anolyte chambers 11a and 11b are supplied by a common anolyte conduit 19 from anolyte reservoir R-11, both chambers being interconnected via conduit 19 and reservoir R-11. Catholyte chambers 13a and 13b are supplied by a common catholyte conduit 18 from catholyte reservoir R-13 both chambers being interconnected via conduit 18 and catholyte reservoir R-13.

Figure 2:
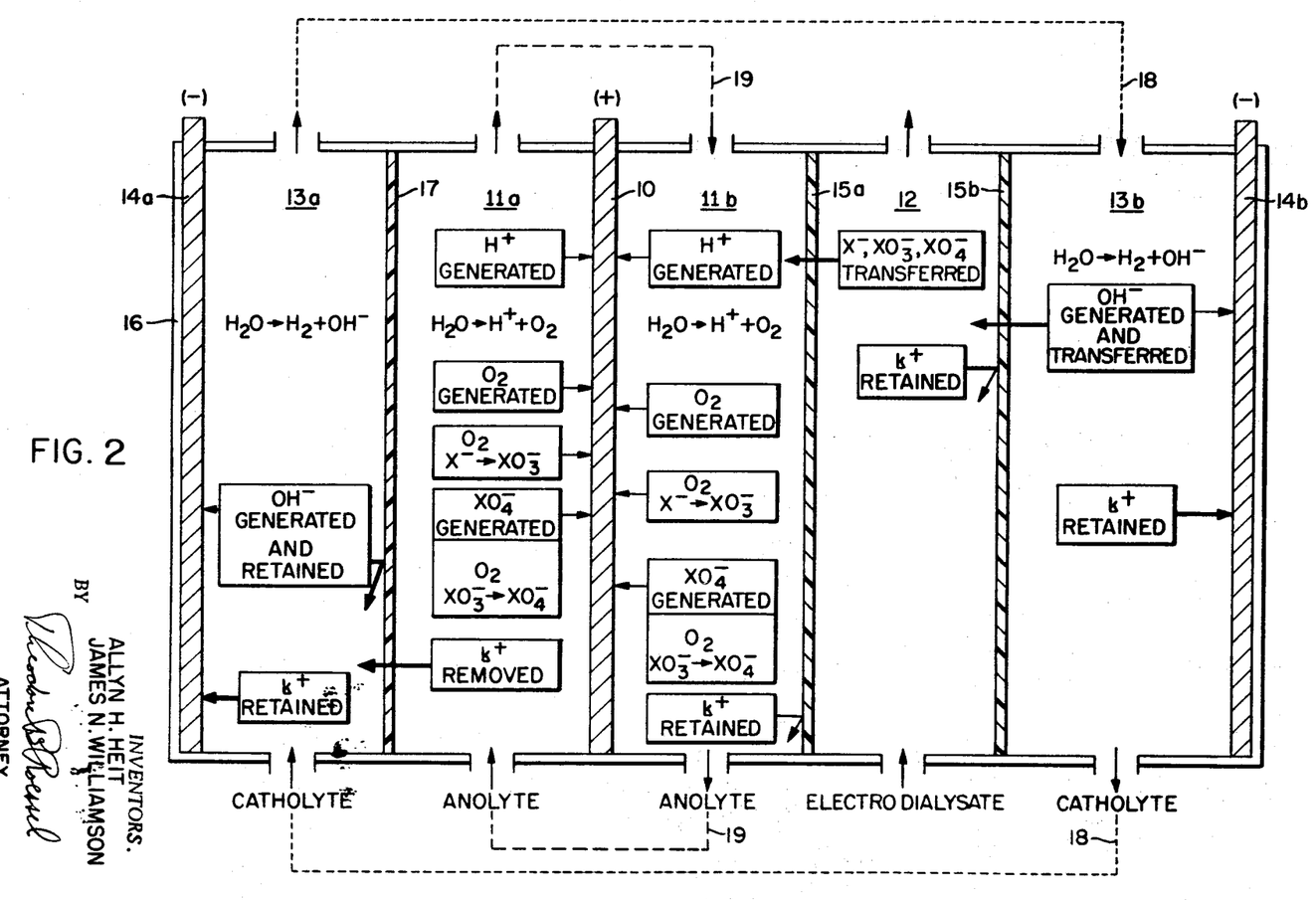
FIG. 2 is a diagrammatic representation of a longitudinal cross section of an electrolytic cell.

FIG. 2 represents a cross section of a five-chambered unit in which oxidation, purification and concentration of typical periodate and chemically reduced periodate anions are depicted as simultaneously occurring in a two-chamber purification section located proximal to a three-chamber concentration section. In the overall cell construction the five chambers designated as 13a, 11a, 11b, 12 and 13b are held within a single frame designated as 16. The frame, 16, may be any material capable of withstanding the corrosive action of the liquors and having suitable structural strength and rigidity to withstand mild temperature increases and the weight of the liquors and other structural components. Anolyte chambers 11a and 11b are interconnected by means of a common conduit designated as 19. Catholyte chambers 13a and 13b are interconnected by means of a common conduit designated as 18. The purification section of the cell which comprises catholyte chamber 13a and anolyte chamber 11a are supplied with direct current by cathode 14a and anode 10 respectively. Chambers 13a and 11a are separated by cation permselective membrane 17. The concentration section of the cell which comprises catholyte chamber 13b, anolyte chamber 11b and middle chamber 12 are supplied with direct current by anode 10, a surface of which defines anolyte chamber 11b, and cathode 14b, a surface of which defines catholyte chamber 13b. The middle chamber, 12, is defined by anion permselective membrane 15a which separates the middle chamber from the anolyte chamber, and anion permselective membrane 15b which separates the middle chamber from the catholyte chamber.

In FIG. 2, when a caustic catholyte is circulated in catholyte chambers 13a and 13b, an aqueous anolyte containing $X^1$, $XO_3^1$ and $XO_4^1$ is circulated in anolyte chambers 11a and 11b, and an electrodialysate containing $X^1$, $XO_3^1$ and $XO_4^1$ is circulated in middle chamber 12, where $X^1$, $XO_3^1$ and $XO_4^1$ represent periodate and chemically reduced periodate anions or perchlorate and chemically reduced perchlorate anions and where all electrolytes contain cations which may be $Na^+$ and $H^+$, or mixtures thereof, designated as $k^+$, the following reactions and migrations occur simultaneously when an electrical potential is applied to the anode and cathodes:

1. $X^1$, $XO_3^1$ and $XO_4^1$ anions migrate from the electrodialysate in chamber 12 to the anolyte in chamber 11b;

2. $k^+$ cation is retained by action of the anion permselective membrane in chamber 12 where it unites with $OH^1$ anion migrating from the catholyte in chamber 13b where it is generated;

3. $H_2O$ and alkali metal hydroxides present in catholyte chambers 13a and 13b generate molecular hydrogen and $OH^1$ anion; the $OH^1$ anion migrates from the catholyte in chamber 13b to chamber 12 through anion permselective membrane 15b and which is retained in chamber 13a by action of cation permselective membrane 17, while the $k^+$ formed in chambers 13a and 13b is retained by the action of the cathodes;

4. $H^+$ and molecular oxygen are generated in anolyte chambers 11a and 11b by electrolytic action on water at the anode; the generated oxygen in combination with the electrical charge resulting in the oxidation of all chemically reduced $XO_4^1$ anions to $XO_4^1$ anions which are shown in generation at anode 10 in chambers 11a and 11b by the electrolytic oxidation steps of $X^1 — XO_3^1$ and $XO_3 — XO_4^1$; and 5. $h^+$ cations are retained in chamber 11b by the action of anion permselective membrane 15a and migrate from the anolyte in chamber 11a through cation permselective membrane 17 to the catholyte in 13a in the direction of cathode 14a where $k^+$ is retained by the action of the catiode 14a.

Therefore, the chemically reduced $XO_4^+$ anions are regenerated in chambers 11a and 11b; the $X^1$, $XO_3^1$ and $XO_4^1$ present in the dialysate in chamber 12 are concentrated by transfer to chamber 11b; and undesirable cations, $k^+$ are removed from the anolyte in chamber 11a by transfer or migration to the catholyte in chamber 13a.

The following specific examples are provided to further illustrate the practice of this invention.

EXAMPLE I

A multichambered electrodialytic cell was constructed by placing a series of purification sections consisting of the following arrangement of chambers: anolyte, catholyte, anolyte, anolyte, catholyte, anolyte, anolyte, catholyte, etc. with a total of seven catholyte chambers, and 13 anolyte chambers in conjunction with a series of concentration sections consisting of the following arrangement of chambers: catholyte, middle, anolyte, anolyte, middle, catholyte, middle, anolyte, etc. With a total of four anolyte chambers, three catholyte chambers and four middle chambers. The concentration and purification section chambers, cathodes and anodes were assembled within a common framework. Assembly of the apparatus was such that a maximum number of anolyte compartments utilized a minimum number of silver-lead anodes. All anolyte chambers of both sections were supplied with anolyte. from a common anolyte circulating system and trough. All catholyte chambers of both sections were supplied with caustic catholyte from a common catholyte circulating system and reservoir. The middle chambers of the concentration section were provided with a circulating system which circulated the middle chamber compartment electrolyte. An ion exchange column containing a highly basic anion exchange resin was provided for removal of iodine derivative residues from spent middle chamber electrolyte. Regeneration of the spent anion exchange resin was accomplished by passing the caustic catholyte through the anion exchange resin bed. Provision was made for the transfer of the eluted iodine-containing catholyte to the anolyte stream to minimize the loss of iodine or its derivatives.

Each chamber was 1 inch thick with minor variations due to gaskets and electrodes and defined a working area of 4 square feet. Membranes were heterogeneous in nature and constructed on a webbing of inactive supporting fibers by means of an inert binder. In the primary section of the electrodialytic apparatus the anolyte and catholyte compartments were separated by cation permselective membranes. Anion permselective membranes were used between the anolyte and middle chambers and catholyte and middle chambers of the concentration section. Ionac Chemical Company 3400 series of membranes which have proven stable for long periods of exposure to the corrosive action of the liquid media used in the circulating streams, were used in the electrodialytic apparatus. Anodes were formed from a lead alloy comprising about 1 percent silver, and the perforated cathode was formed from a mild steel.

The catholyte was a 5 percent sodium hydroxide solution. The anolyte was the primary filtrate from a periodic acid oxidation of starch for the production of dialdehyde starch and consisted of unreacted periodate and iodate anions. The iodate was present from the reduction of periodate during the polysaccharide oxidation. The solution in the middle compartments of the concentration section consisted of the dilute iodate-periodate-containing washings from the dialdehyde starch filter cake.

Anolyte, 85 gallons, with a total iodate-periodate concentration (calculated as periodate) of 83.2 grams/liter was circulated through the anolyte system common to both the purification and concentration sections. The actual periodate concentration of the anolyte was 64.0 grams/liter. Therefore, 77.0 percent of the anolyte was periodic acid. The 5 percent NaOH catholyte was circulated through the catholyte system common to both sections. A volume of 70 gallons of dilute wash water was circulated through the middle chamber of the concentration section. The total iodine content of the dilute wash water was 9.9 grams/liter (calculated as periodate).

Voltage was applied at the electrodes by means of a rectifier, and the current of the system was maintained at approximately 1200 amps. The temperature was normally 35–40° C.

The table following shows the results of the electrodialytic regeneration and concentration. The column represented as 'Total' under 'Middle' represents the total concentration of iodate and periodate (calculated as periodate) in grams/liter in the middle compartment of the concentration section.

| Time Hrs. | ANOLYTE | | | Middle |
|---|---|---|---|---|
| | *Total | Periodate | % Periodate | *Total |
| 0 | 83.2 g./l. | 64.0 g./l. | 76.0 | 9.90 g./l. |
| 2 | 85.4 g./l. | 69.4 g./l. | 81.3 | 9.73 g./l. |
| 3 | 85.9 g./l. | 71.5 g./l. | 83.2 | 9.54 g./l. |
| 4 | 87.0 g./l. | 74.8 g./l. | 86.0 | 9.48 g./l. |
| 5 | 89.0 g./l. | 78.0 g./l. | 87.6 | 9.44 g./l. |

*Calculated as periodate

The table shows that the concentration of periodate and percent periodate increases with time, indicative of regeneration of periodate from iodate in the liquor. The total concentration of the iodate-periodate liquor in the middle compartment decreases with time indicative of removal of the iodine derivatives from the middle stream.

The dilute wash waters were cycled through the middle chamber of the concentration section until the iodate concentration of the middle stream was 1.5 g./l. The 70 gallons of liquor in the middle stream was then cycled through an ion exchange column consisting of 1.5 cu. ft. of strong base polystyrene alkyl quaternary ammonium ion exchange resin in the sulfate form, manufactured by Ionac Chemical Company as Ionac A-540. The eluted liquor contained no trace of iodine or its derivatives and was discharged into the sewer.

The strong base ion exchange resin was exhausted after eluting several other cycles of iodate-containing liquor through the column. Exhaustion of the resin can be determined by the presence of iodate in the eluted liquor. The ion exchange resin was then regenerated by passing the caustic catholyte from the catholyte circulating system through the resin bed. The eluted liquor was added to the anolyte system for regeneration.

EXAMPLE II

In an electrodialytic regeneration and concentration of the filtrates from a periodic acid conversion of cellulose to dialdehyde cellulose the same apparatus, method and quantities were used as given in Example I. The following table showing the total concentration of iodate-periodate in grams/liter in the anolyte and middle streams and the concentration and percent periodate in the anolyte in relation to length of time of operation of the apparatus at a current of 1200 amps. input is given below.

| Time Hrs. | ANOLYTE | | | Middle Chamber |
|---|---|---|---|---|
| | *Total (Conc.) | Periodate (Conc.) | % Periodate | *Total |
| 0 | 67.4 g./l. | 22.1 g./l. | 32.9 | 18.4 g./l. |
| 1 | 67.9 g./l. | 28.6 g./l. | 42.2 | 18.1 g./l. |
| 2 | 68.8 g./l. | 30.4 g./l. | 43.6 | 17.4 g./l. |
| 5.5 | 72.3 g./l. | 40.5 g./l. | 56.0 | 13.9 g./l. |
| 7.5 | 73.4 g./l. | 44.1 g./l. | 60.3 | 13.1 g./l. |
| 9.5 | 76.0 g./l. | 49.0 g./l. | 64.5 | 12.4 g./l. |
| 11.5 | 78.0 g./l. | 54.0 g./l. | 69.3 | 11.9 g./l. |

*Calculated as periodate

It can be seen from examination of the data that the percentage of periodate in the anolyte increases with time. Note that within 11.5 hours the periodate concentration of the anolyte more than doubled. The total concentration of the iodate-periodate in the middle chamber was reduced indicating that the apparatus has concentrated the anolyte and removed iodate-periodate from the dilute wash waters. The dilute wash waters upon reaching a concentration of 1.5 g./l. in the middle circulating stream were cycled through the strong base ion exchange resin resulting in complete removal of iodine and its derivatives.

EXAMPLE III

The anolyte, catholyte and middle chambers of the concentration section of the apparatus were disconnected from their circulating systems by merely clamping off the hoses leading to those chambers, and the purification section of the cell was operated alone. The operating conditions and capacities with the exception of the removal of the concentration section from operation, were the same as those given in Example I. The table below shows the results of the regeneration of periodate from the spent liquors filtered from dialdehyde starch product.

| | Anolyte | | |
|---|---|---|---|
| Time, hrs | Total conc.* (Iodate-periodate) g./l. | Periodate conc., g./l. | Percent periodate |
| 0 | 110.0 | 37.0 | 28.0 |
| 1 | 110.0 | 49.0 | 44.5 |
| 3 | 117.0 | 78.5 | 66.7 |
| 5 | 119.0 | 109.5 | 91.8 |
| 6 | 123.9 | 118.2 | 95.5 |

*Calculated as periodate

The data show that the percent and concentration of iodate in the anolyte increase with time during the operation of the apparatus, indicating that the purification section may be operated independently of the concentration section.

EXAMPLE IV

The anolyte and catholyte chambers of the purification section of the apparatus were disconnected from their circulating systems by merely clamping off the hose leading to those chambers, and the concentration section of the cell was operated alone. The operating capacities and conditions with the exception of the removal of the purification section from operation, were the same as those given in Example I. The table following shows the results of the concentration of the anolyte by removal of the iodate and periodate remaining in the dialdehyde starch wash waters.

| | ANOLYTE | | Middle |
|---|---|---|---|
| Time Hrs. | *Total Conc. | Periodate Conc. | *Total Conc. |
| 0 | 26.4 g./l. | 26.8 g./l. | 63.0 g./l. |
| 2 | 31.0 g./l. | 30.3 g./l. | 62.4 g./l. |
| 3.5 | 31.8 g./l. | 32.6 g./l. | 59.2 g./l. |
| 6 | 38.5 g./l. | 38.4 g./l. | 55.6 g./l. |
| 8.5 | 42.5 g./l. | 41.3 g./l. | 53.7 g./l. |
| 27 | 117.4 g./l. | | 20.3 g./l. |

*Calculated as periodate

The data indicate that the total iodate-periodate concentration of the middle chamber in the concentration section decreases with a corresponding increase in the total iodate-periodate concentration and in the periodate the concentration in relation to the length of time that the apparatus is in operation, indicating that the concentration section of the apparatus may be operated independently of the primary section.

The apparatus constructed according to this invention is suitable for the oxidation of chemically reduced per(halo-oxygen) acids and their salts to per(halo-oxygen) acids and their salts which may be used to oxidize polysaccharides. Special application of the apparatus to the oxidation, purification and recovery of periodate and chemically reduced periodate anions which were recovered from liquors of oxidized polysaccharides, was successful.

The present invention provides a process for the purification and concentration of periodate and chemically reduced periodate anions with substantially complete recovery of all periodate and chemically reduced periodate anions by a combination of an electrolytic technique and an ion exchange technique. The present invention also provides a single electrolytic apparatus in which concentration, purification and oxidation may be carried out simultaneously.

It is to be understood that the invention is not to be limited by these examples or by the specific reaction conditions, construction materials, concentrations of liquors and the like, but includes variations and modifications falling within the scope of the appended claims and drawings.

We claim:

1. A method for the electrodialytic purification and concentration of inorganic per(hal-oxygen) acids and their salts and chemically reduced derivatives thereof comprising:
   a. providing in combination (i) at least one two-chamber purification cell having an anolyte chamber containing aqueous anolyte and having an anode therein, a catholyte chamber containing aqueous catholyte and having a cathode therein and a cation permselective membrane separating the anolyte chamber and the catholyte chamber; and (ii) at least one three-chamber concentration cell having an anolyte chamber containing aqueous anolyte and having an anode therein, a middle chamber containing aqueous, inorganic per(halo-oxygen) acids, the salts of said acids and the chemically reduced derivatives thereof, an anion permselective membrane separating the anolyte and middle chambers, a catholyte chamber containing aqueous catholyte and having a cathode therein, and a permselective membrane separating the catholyte and middle chambers;
   b. circulating a common stream of aqueous sodium hydroxide catholyte into, through and from the catholyte chambers of the purification and concentration cells;
   c. circulating a common stream of a aqueous anolyte containing at least about 4 weight percent of inorganic per(halo-oxygen) acids, the salts of said acids and the chemically reduced derivatives thereof in anionic form paired with at least one type of cation, into, through and from the anolyte chambers of the purification and concentration cells;
   d. circulating a steam of an aqueous, dialysate having a concentration of a at least about 0.5 weight percent of anions of inorganic per(halo-oxygen) acid, the salts of said acid and the chemically reduced derivatives thereof paired with at least one cation selected from the class consisting of $Na^+$, $NH_4^+$, and $H^+$, into, through and from the middle chamber of the concentration cell; and
   e. imposing an electrical current between the anodes and cathodes whereby the per(halo-oxygen) anions and chemically reduced anions thereof migrate from the middle chamber of the concentration cell to the anolyte chamber of the concentration cell causing a substantial increase in concentration of per(halo-ocygen) and chemically reduced per(halo-oxygen) anions in the anolyte; cations migrate from the anolyte chamber of the purification cell to the catholyte chamber of the purification cell; and chemically reduced per(halo-oxygen)anions are oxidized at the anodes of the purification and concentration cells causing a substantial increase in concentration of per(halo-oxygen) anions and a decrease in concentration of the chemically reduced per(halo-oxygen) anions.

2. A method as defined by claim 1 wherein the aqueous dialysate is a solution of a halo-anionic species selected from the class consisting of iodide, chloride, iodate, chlorate, periodate and perchlorate anions, and mixtures thereof.

3. A method as defined by claim 1 wherein the aqueous anolyte is a solution of a halo-anionic species selected from the class consisting of iodide, iodate and periodate and mixtures thereof, and the paired cation is selected from the class consisting of $Na^+$, $NH_4^+$ and $H^+$ and mixtures thereof.

4. A method as defined by claim $H^+$ wherein the aqueous anolyte is a solution of a halo-anionic species selected from the class consisting of chloride, chlorate and perchlorate and mixtures thereof, and the paired cation is $H^+$.

PO-1050
(5/69)

UNITED STATES PATENT OFFICE
CERTIFICATE OF CORRECTION

Patent No. 3,607,604              Dated September 21, 1971

Inventor(s) Allyn Harold Heit and James Norris Williamson

It is certified that error appears in the above-identified patent and that said Letters Patent are hereby corrected as shown below:

In the specification, column 2, line 2, delete "enclosed" and substitute therefor --disclosed--. Column 4, line 2, "HH$_4$+" should read --NH$_4$+--. Column 5, line 65, delete "liquid" and substitute therefor --liquor--. Column 8, actual lines 36-37, 38, 39-40, 46, and 72, "X$^1$, XO$_3$$^1$ and XO$_4$$^1$" should read --X$^-$, XO$_3$$^=$ and XO$_4$$^-$--. Column 8, actual line 63, "XO$_4$$^1$" should read --XO$_4$$^-$-- (both occurrences). Column 8, actual lines 65, "X$^1$——XO$_3$$^1$ and XO$_3$——XO$_4$$^1$" should read --X$^-$——XO$_3$$^-$ and XO$_3$——XO$_4$$^-$--. Column 8, actual line 71, "XO$_4$+" should read --XO$_4$$^-$--. Column 8, actual lines 49, 53, and 54, "OH$^1$" should read --OH$^-$--. Column 8, actual line 66, italicized "h+" should read italicized --k+--. Column 9, line 23, delete the period "." after anolyte. Column 11, line 55, delete "Middle" from the table and place --MIDDLE-- above the far right column designated *Total Conc. .

In the claims, claim 1, lines 26 and 68, correct the spelling of --per(halo-oxygen)--.

Signed and sealed this 28th day of March 1972.

(SEAL)
Attest:

EDWARD M. FLETCHER, JR.          ROBERT GOTTSCHALK
Attesting Officer                Commissioner of Patents